Aug. 11, 1931.  A. W. OTT  1,818,349
METHOD OF MANUFACTURING INNER TUBES FOR PNEUMATIC TIRES
Filed Feb. 21, 1930  2 Sheets-Sheet 1
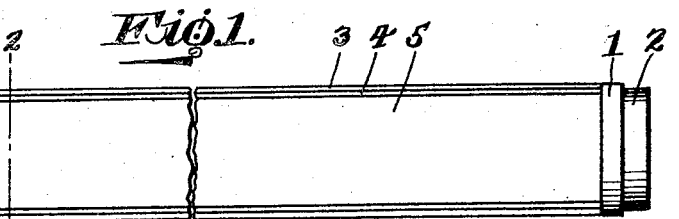
Fig. 1.
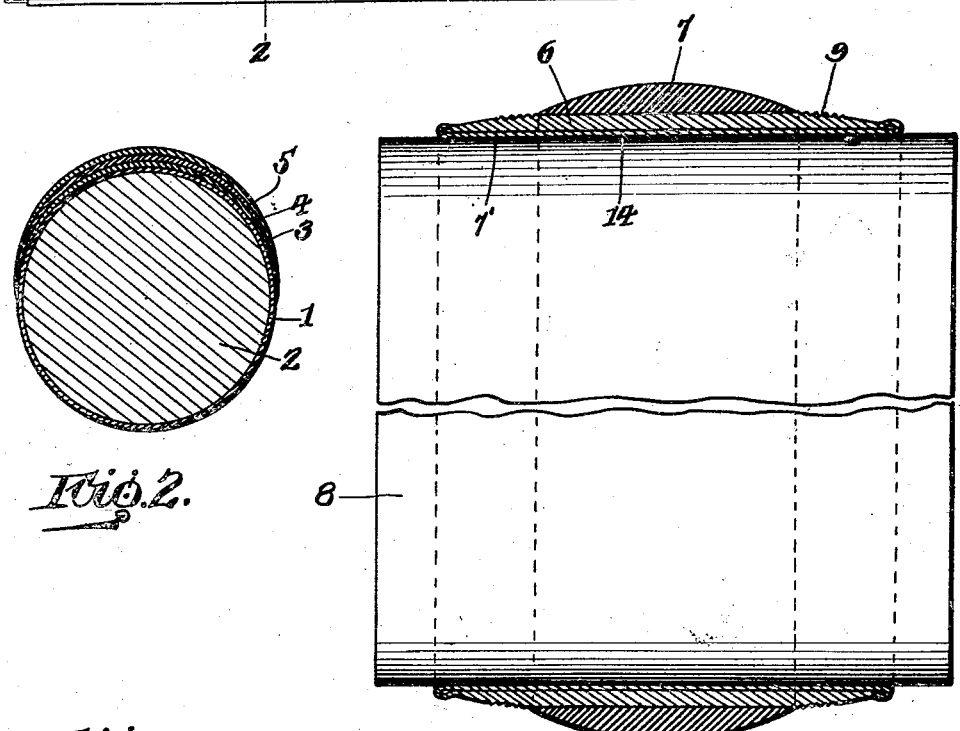
Fig. 2.
Fig. 3.
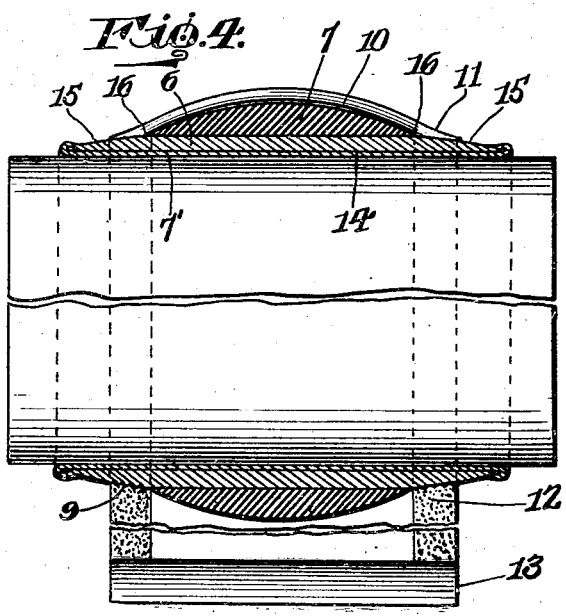
Fig. 4.
INVENTOR.
Arthur W. Ott
BY
Geo. F. Kimmel
ATTORNEY.

Aug. 11, 1931.  A. W. OTT  1,818,349
METHOD OF MANUFACTURING INNER TUBES FOR PNEUMATIC TIRES
Filed Feb. 21, 1930  2 Sheets-Sheet 2
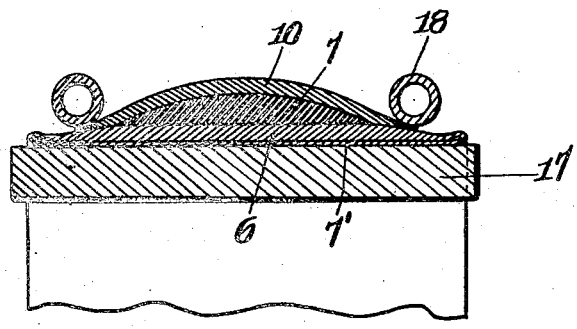
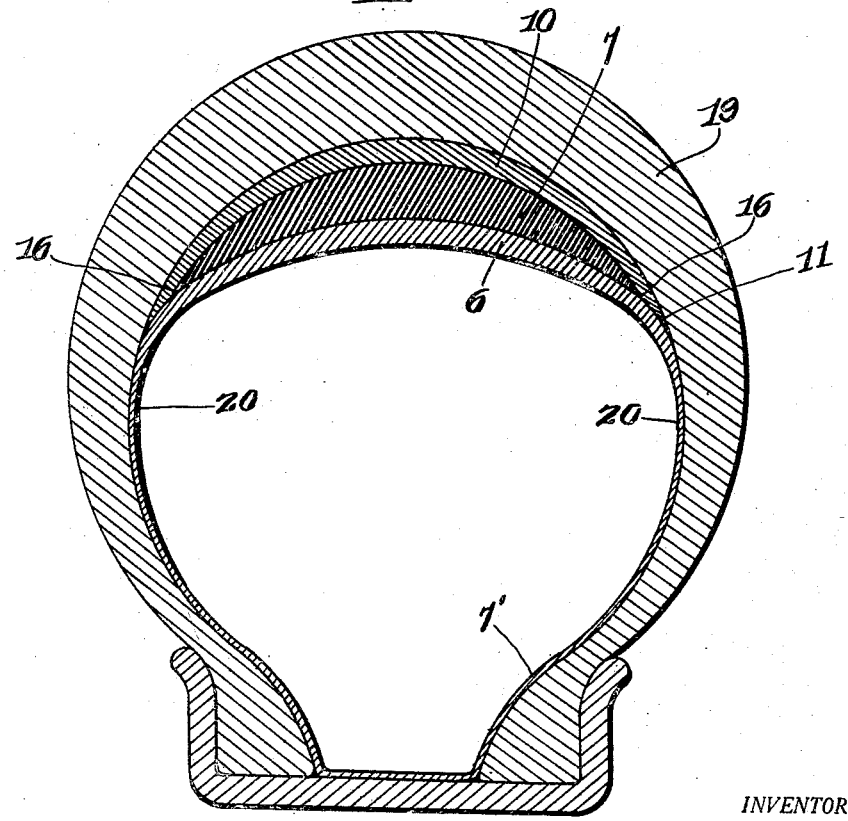
INVENTOR.
Arthur W. Ott
BY
Geo. P. Kimmel
ATTORNEY.

Patented Aug. 11, 1931

1,818,349

UNITED STATES PATENT OFFICE

ARTHUR W. OTT, OF DUBUQUE, IOWA

METHOD OF MANUFACTURING INNER TUBES FOR PNEUMATIC TIRES

Application filed February 21, 1930. Serial No. 430,409.

This invention relates to a method of manufacturing inner tubes of the type formed with a composite tread portion having an inner wall, an outer wall, and a healing compound interposed between the walls.

One of the methods heretofore employed in the manufacture of tubes of such character is to place a tube of ordinary construction on a block or drum which is either convex or concave in cross section, apply a healing compound to the tube so positioned, then place a rubber pad over the healing compound so that the marginal portions of the pad will project laterally from the healing compound, and then vulcanize the pad in applied position, such vulcanization serving to unite the pad with the tube proper and with the healing compound.

One of the disadvantages of the foregoing method is that in the vulcanization of the pad, there is a migration of sulphur into the healing compound which causes a partial vulcanization of the latter and destroys or at least reduces its effectiveness as an agent for healing punctures. In some instances the pad is formed of a tube stock having a low content of sulphur, but this expedient has proved unsatisfactory for the reason that there is a migration of whatever quantity of sulphur is employed upon the heating of the stock, and therefore, while the vulcanization of the healing compound is reduced, it is not entirely eliminated.

Another disadvantage of the foregoing method is that when the healing compound is applied to the tube with the latter positioned on a block or drum having a convex face, the inner wall of the tread portion will wrinkle and eventually break, owing to the flexing of the tread portion of the tube in the use of the same within a tire, due to the contact of the tire with a road surface. The wrinkling of the inner wall causes the application of an uneven pressure on the healing compound, while the breaking of the inner wall causes a dissipation, in whole or in part, of the healing compound, thereby destroying the puncture-proof characteristic of the tube at the point of such dissipation.

Another disadvantage of the foregoing method, is that when the healing compound is applied to a tube with the latter positioned on a block or drum having a concave outer face, the inner wall of the finished tube when deflated depends into the interior of the tube proper, and when the tube is inflated, the depending inner wall is forced outwardly, thereby compressing the healing compound and rendering the same less effective for the purpose of healing punctures.

In order to overcome the foregoing and other disadvantages, I build up the tread portion of the tube in such a manner that the inner wall of the tread portion is normally in a flat condition transversely of the tube when the latter is deflated, and further in such a manner that the healing compound will be housed within a confining wall having no portion thereof any weaker than any other portion, and with such confining wall having a greater resistance to stretch than the wall of the tube proper. Further, I assemble the parts which provide the composite tread portion in such a manner that there can be no migration of sulphur during such assembly.

The primary object of the invention is to provide a practical, efficient and economical method of building an inner tube which is capable of healing itself in the event of a puncture, and which further is capable of continued satisfactory performance after long periods of use.

In the accompanying drawings in which like numerals are employed to designate like parts throughout the several views:—

Figure 1 is a plan illustrating the manner of forming the thickened inner wall at the tread portion of the tube.

Figure 2 is a section taken on line 2—2 of Figure 1.

Figure 3 is a section showing the position of the tube when the healing compound is applied to the thickened inner wall of the tread portion.

Figure 4 is a view similar to Figure 3, showing the pad which forms the outer wall of the tread portion in position with respect to the inner wall and to the healing compound.

Figure 5 is a section illustrating the manner of uniting the outer and inner walls of the tread portion.

Figure 6 is a completed tube inflated within a tire.

In carrying out my improved method of making a puncture-proof inner tube, a suitable length of tube stock 1 is blown onto a pole or mandrel 2 in the usual manner. A plurality of sheets of uncured rubber, in the present instance three in number, designated by the numerals 3, 4 and 5 are then placed on the tube stock 1. The sheets of rubber 3, 4 and 5 are of slightly less length than the tube 1, being arranged flush with the tube at one end thereof, and having their opposite ends slightly spaced from the opposite end of the tube. The sheets 3, 4 and 5 progressively decrease in width with the wider sheet extending substantially half way around the tube 1. Preferably the sheets 3, 4 and 5 will be arranged in superposed relation before being positioned on the tube 1, although they may be applied to the tube individually if desired.

After the sheets 3, 4 and 5 have been positioned on the tube 1 the entire mass is vulcanized in any well known manner. Preferably a strip of fabric will be wound around the assembled strips and tube before the mass is vulcanized in order to insure a firm union between the assembled strips and tube.

After the assembled strips and tube have been vulcanized, the fabric tape is removed therefrom, and the product is stripped from the pole in the usual manner, which turns the vulcanized mass inside-out. The tube is then provided with a valve in the usual manner and the ends of the tube are secured together with one end of the mass formed from the strips 3, 4 and 5 abutting the other end thereof. The product this far produced is of substantially the same construction as any ordinary inner tube, except that a wall portion 6 thereof is of materially greater thickness than the remaining wall portion 7' thereof.

The product is then stretched on a cylindrical drum 8 which is of uniform diameter throughout, the product being disposed on the drum in such a manner that the wall 6 provides the outer or tread portion. The outer face of the wall 6 is then roughened and a strip of tacky composition 7 placed thereon. The composition 7 is preferably tubered into the proper shape before being applied to the wall 6, and in applying the composition 7, the latter is centered with respect to the wall, with the side edges of the composition terminating a material distance inwardly of the side edges of the wall. If desired a thin coat of cement may be applied to the outer face of the wall 6 before the composition 7 is applied thereto. In any event, the outer face of that portion of the wall 6 which projects laterally beyond the composition 7 is thoroughly roughened, as indicated at 9, and is given a relatively heavy coating of cement. If desired a thin coat of cement may be applied to the outer face of the composition 7.

The next step in the manufacture of the tube is to position a pad 10 of vulcanized rubber over the composition 7, the pad 10 being of proper width to project laterally beyond the side edges of the composition. The pad 10 is preferably molded into the proper shape before being applied to the tube, and is formed with marginal portions 11 which gradually decrease in thickness in an outward direction. Before positioning the pad 10, the inner faces of the marginal portions 11 are roughened as indicated at 12 in order that a firm union may be had between the marginal portions 11 and the wall 6. The end faces of the pad 10 are bevelled as indicated at 13 to provide a smooth joint between the ends of the pad when such ends are brought together. Owing to the stretching of the tube on the drum 8, the inner face 14 of the wall 6 is maintained in a flattened position transversely thereof while the composition 7 and pad 10 are being applied thereto. The flattening of the inner face 14 of the wall 6 on the drum 8 provides an outward taper 15 on the outer face of the wall 6, adjacent the side edges of the latter. The inner extremities of the tapered portions 15 are indicated at 16 and are in registry with the inner extremities of the marginal portions 11 of the pad 10. The tube is next removed from the drum 8 and hung over a board 17 while heat is applied to the marginal portions 11 of the pad 10 through the medium of steam pipes, such as 18. The heating of the marginal portions 11 firmly unites the latter with the wall 6, thereby completing the formation of the composite tread portion of the tube without applying any heat to the portion of the pad 10 disposed over the composition 7. It is important that the wall 6 and pad 10 be thoroughly cured before they are assembled with respect to the composition 7 in order that there will be no migration of sulphur into the composition either in the construction or use of the tube. It is also important that the pad 10 be of the same thickness as the thickened wall 6 in order that the composition may be housed within a confining wall of equal strength throughout.

After the marginal portions 11 of the pad 10 have been united with the wall 6, the tube is completed, and the inner wall 6 of the tread portion thereof will normally assume a flat position transversely of the tube, while the latter is deflated, due to the flat position in which the inner wall 6 is maintained while the composition 6 and pad 10 are being applied thereto.

Owing to the equality in thickness of the pad 10 and wall 6, and to the greater thickness of such pad and wall with respect to the remaining wall portion 7' of the tube, the pad 10 and wall 6 are substantially resistant to stretch, therefore, when the tube is inflated within a tire, such as 19, the stretching caused by the inflation will be confined to the wall portion 7', and the entire tread portion of the tube will move bodily into a position with the outer face of the pad 10 in contacting relation with the inner face of the tire. It is not to be understood that the pad 10 and wall 6 are incapable of being stretched if a sufficient force is applied thereto, but it is to be understood that a force sufficient to stretch the pad 10 and wall 6 so far exceeds the force required to stretch the wall portion 7' that the pad 10 and wall 6 will not stretch, and will not move relative to each other or to the healing composition, when the tube is inflated in a normal manner by the introduction of air thereinto.

By forming the pad 10 and wall 6 of equal thickness, the healing composition 7 is provided with a confining wall of uniform thickness throughout, and without any point of such confining wall being weaker than any other point thereof. Consequently when the tread portion of the tube is flexed in the normal use of the same, the pad 10 and wall 6 flex uniformly and simultaneously, carrying the healing composition therewith. In such flexing, the wall 6 is moved toward its normal flat position when the tube is deflated, therefore there is no crowding of the material forming such wall, and no relative movement thereof with respect to the pad 10 and healing composition 7. Owing to the gradually decreasing thickness of the tube wall between the tread portion and side walls thereof, due to the portions 15 of the wall which project beyond the pad 10, there is a tendency for the tube to flex more readily at its side wall portions 20 than at any other portion, with a consequent reduction in the degree of flex at the tread portion of the tube. If desired, the non-stretch characteristic of the tread portion of the tube may be still further increased relative to the wall portion 7' by forming the wall 6 and pad 10 of a less pure tube stock than is employed in the construction of the wall portion 7', although this is not necessary.

While the method herein illustrated and described constitutes the best means known for producing a tire having the desired characteristics, it is to be understood that slight deviations in the method may be resorted to, so long as such deviations fall within the scope of the invention as defined in the appended claims.

What I claim is:

1. A method of manufacturing punctureproof inner tubes consisting of forming a vulcanized inner tube with a thickened tread portion, stretching said tube on a flat face drum, applying a healing composition to the thickened tread portion, positioning a pad of vulcanized rubber of uniform elasticity throughout and of the same thickness as the thickened tread portion over the composition in a manner to project marginal portions of the pad beyond the composition, and vulcanizing the projecting portions of the pad to said tread portion.

2. A method of manufacturing punctureproof inner tubes consisting of forming a vulcanized inner tube with a thickened tread portion, stretching said tube over a flat face drum, applying a healing composition centrally of the thickened tread portion, positioning over the composition a pad of vulcanized rubber of the same thickness as the thickened tread portion and having its inner face normally conforming in contour with the outer surface of the composition with marginal portions of the pad projecting beyond the composition, and vulcanizing the projecting portions of the pad to said tread portion.

3. A method of manufacturing punctureproof inner tubes consisting of forming an inner tube with a thickened tread portion of uniform strength throughout a centrally located part thereof, flattening the thickened tread portion transversely of the tube, applying a healing composition to the uniform strength part of the thickened tread portion while maintaining the latter in its flat position, forming a pad solely of vulcanized rubber having a central portion thereof corresponding in strength to the uniform strength part of the thickened tread portion and having its inner face normally conforming in contour with the outer surface of the composition and adjacent faces of the thickened tread portion, positioning the pad over the composition with marginal portions of the pad projecting beyond the composition, and securing the projecting portions of the pad to said tread portion.

In testimony whereof, I affix my signature hereto.

ARTHUR W. OTT.